UNITED STATES PATENT OFFICE.

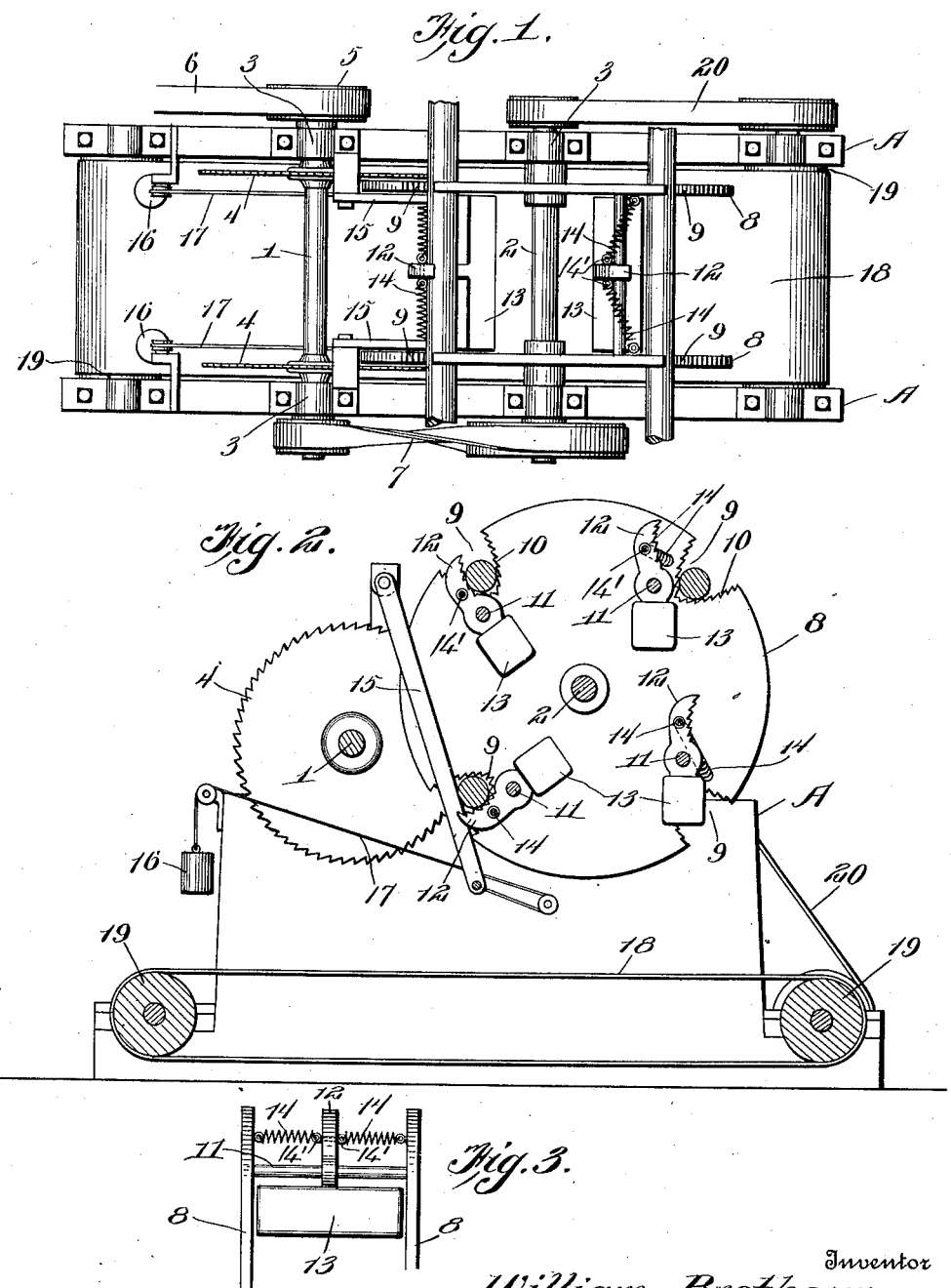

WILLIAM BRETHOUR, OF GRAND RAPIDS, MICHIGAN.

WOOD-SAWING MACHINE.

1,095,076.  Specification of Letters Patent.  Patented Apr. 28, 1914.

Application filed October 16, 1912.  Serial No. 726,109.

*To all whom it may concern:*

Be it known that I, WILLIAM BRETHOUR, a citizen of the United States, residing at Grand Rapids, in the county of Kent and State of Michigan, have invented new and useful Improvements in Wood-Sawing Machines, of which the following is a specification.

This invention relates to wood sawing machines and particularly to machines for sawing bolts or sticks of wood to a predetermined uniform length.

The invention has for its object to provide simple and improved means whereby the bolts or sticks will be held securely while being acted on by the saws.

A further object of the invention is to simplify and improve the construction by the provision of means for ejecting the bolts or sticks after being operated upon by the saws.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing, Figure 1 is a top plan view of a sawing machine constructed in accordance with the invention. Fig. 2 is a longitudinal sectional view taken on the line 2—2 in Fig. 1. Fig. 3 is a detail view.

Corresponding parts in the several figures are denoted by like characters of reference.

Supported for rotation on a suitable frame or base A are shafts 1 and 2, said shafts being mounted in boxes or bearings 3. The shaft 1 carries a pair of circular saws 4 which are suitably spaced thereon, and said shaft 1, which may be driven from a suitable motor by means such as a pulley 5 and belt 6, is connected with the shaft 2 by means such as a twisted belt 7, whereby the shaft 2 will be rotated reversely to the shaft 1. The transmission means should also be so proportioned that the saw carrying shaft 1 will be driven at a greater speed than the shaft 2.

Suitably mounted upon the shaft 2 to rotate therewith are two circular heads 8 constituting carriers, said carriers being spaced apart intermediate the saws 4, the circumferences of which are overlapped by the perimeters of the carriers. The carrier heads are provided in the peripheries thereof with V-shaped notches or recesses 9 the side walls of which converge in the direction of the axis of the shaft 2 to receive the material that is to be sawed, said recesses being provided with gripping teeth 10. The carrier heads are connected together, adjacent to the recesses 9 by rods 11 carrying serrated grip hooks 12 which coact with the toothed walls of the recesses 9 to retain in said recesses the sticks or bolts that are to be sawed, said serrated hooks being provided with counterweights 13 disposed intermediate the heads 8. Suitably arranged buffer springs 14 are provided to take up the impact of the counterweights 13 when the grip members 12 are rotated about the shafts 11 when the machine is in operation, as will be presently seen. These buffer springs, as I have termed them, consist of coiled springs connected at one end with the disks 8 and at the opposite ends with the terminals of a pin or pivot member 14' that extends through the grip member 12. It will be evident that while these buffer springs do not interfere with the rotation of the weighted grip members about the axes of the rods 11, they will to some extent counteract and cushion the weights 13, taking the jar off the machine and avoiding battering of the material that is being operated upon, as well as excessive vibration of the machine.

Hingedly supported above the shafts 1, 2 are arms 15, said arms extending downwardly between the carrier heads 8 and adjacent to the inner faces thereof. The lower free ends of the arms 15 are resiliently impelled in the direction of the shaft 2 on which the carrier heads are supported by the action of weights 16 which are connected with the lower ends of the arms 15 by suitably guided flexible elements, such as cords 17. Suitably arranged springs may be used in place of the weights and cords for which such springs are obvious mechanical substitutes. An endless carrier belt 18 is mounted on drums 19 which are journaled in the frame, said belt being adapted to travel beneath the carriers and the saws, and one of said drums being driven by a belt 20 from the shaft 2. The material that has been sawed, as it is ejected from the carriers, drops upon its belt and is carried away from the machine.

In the operation of this invention, the operator standing at one end of the machine adjacent to the carrier heads places the sticks or bolts to be sawed in the up-going recesses 9 which are unobstructed by the grip hooks 12, which latter are maintained in an upstanding position by the counterweights 13. As the carrier heads rotate, the grip hooks will gradually pass into engagement with the sticks with which they are held in engagement by the counterweights. As the sticks approach the saws, they will be engaged by the arms 15 and will thus be held very securely while being operated on by the saws which serve to cut off the ends from said sticks. As the rotation of the carrier heads progresses the sticks are disengaged from the arms 15, and as the counterweights pass over the shafts 8 and beyond the axes of said shafts, the grip hooks will be rotated, thus releasing the bolts or sticks which are ejected from the respective recesses by the action of the counterweights, the sticks dropping on the endless carrier 18 whereby they are conveyed away from the machine.

Having thus described the invention, what is claimed as new, is:—

1. In a device of the class described, a carrier comprising a pair of heads supported for rotation and having peripheral recesses for the reception of material to be operated upon, grip members mounted for rotation on said rods said grip members being positioned to engage material placed in the recesses and having counterweights to assist in completing the rotation at the proper time of said grip members, and springs disposed to resist the action of the counterweights.

2. In a machine of the class described, a carrier comprising a pair of heads supported for rotation and having peripheral recesses, rods connecting the heads, said rods being disposed adjacent to the recesses, grip hooks mounted for rotation on the rods and having counterweights, said grip hooks being positioned to engage material placed in the recesses to be operated upon, pivot members extending through the grip hooks, and coiled springs connecting the ends of the pivot members with the heads.

In testimony whereof I affix my signature in presence of two witnesses.

WILLIAM BRETHOUR.

Witnesses:
RICHARD L. NEWNHAM,
EDITH BRETHOUR.

---

Copies of this patent may be obtained for five cents each, by addressing the "Commissioner of Patents, Washington, D. C."